(12) United States Patent
Samuel et al.

(10) Patent No.: US 11,481,248 B2
(45) Date of Patent: Oct. 25, 2022

(54) COMPLETING AN SMI TASK ACROSS MULTIPLE SMI EVENTS

(71) Applicant: Dell Products L.P., Round Rock, TX (US)

(72) Inventors: Balasingh P. Samuel, Round Rock, TX (US); Richard M. Tonry, Austin, TX (US); Nicholas D. Grobelny, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 171 days.

(21) Appl. No.: 16/985,977

(22) Filed: Aug. 5, 2020

(65) Prior Publication Data

US 2022/0043669 A1 Feb. 10, 2022

(51) Int. Cl.
*G06F 9/48* (2006.01)
*G06F 9/54* (2006.01)

(52) U.S. Cl.
CPC ............ *G06F 9/485* (2013.01); *G06F 9/4812* (2013.01); *G06F 9/4881* (2013.01); *G06F 9/542* (2013.01)

(58) Field of Classification Search
CPC ...... G06F 9/485; G06F 9/4812; G06F 9/4881; G06F 9/542
See application file for complete search history.

(56) References Cited

U.S. PATENT DOCUMENTS

| | | | | |
|---|---|---|---|---|
| 5,764,999 A | * | 6/1998 | Wilcox | G06F 9/45533 710/262 |
| 2007/0150632 A1 | * | 6/2007 | Ayyar | G06F 13/24 710/260 |
| 2009/0144533 A1 | * | 6/2009 | Mulcahy | G06F 21/575 713/2 |
| 2014/0274305 A1 | * | 9/2014 | Shimabukuro | G07F 17/3241 463/24 |
| 2015/0067311 A1 | * | 3/2015 | Forristal | G06F 11/1433 713/2 |
| 2016/0246964 A1 | * | 8/2016 | Martinez | G06F 21/572 |
| 2018/0089012 A1 | * | 3/2018 | Kamino | G06F 11/0751 |

\* cited by examiner

*Primary Examiner* — Emerson C Puente
*Assistant Examiner* — Jonathan R Labud
(74) *Attorney, Agent, or Firm* — Kirton McConkie; Brian Tucker (57) ABSTRACT

An SMI task to be completed across multiple SMI events. An OS agent can be employed to determine a current load on a computing device. Based on the load, the OS agent can create an SMI message that specifies a maximum duration for an SMI event and that segments the SMI data for the SMI task. The OS agent can provide the SMI message to BIOS as part of requesting that the SMI task be performed. During the resulting SMI event, the BIOS can reassemble the segmented SMI data and then perform the SMI task. If this processing cannot be completed within the specified maximum duration for an SMI event, the BIOS can pause its processing and cause a subsequent SMI event to occur during which the processing can be resumed. In this way, the SMI task can be completed across multiple SMI events while ensuring that no single SMI event exceeds the specified maximum duration.

20 Claims, 9 Drawing Sheets

COMPLETING AN SMI TASK ACROSS MULTIPLE SMI EVENTS

CROSS-REFERENCE TO RELATED APPLICATIONS

N/A

BACKGROUND

System Management Mode (SMM) is a processor state that is used for system management operations. To enter SMM from the operating system runtime, a System Management Interrupt (SMI) is generated. In response to the SMI, the platform firmware (or BIOS) suspends normal execution by storing the state of the CPU in a region of RAM called the SMRAM, performs a requested SMI task within SMM and then resumes normal operation by restoring the CPU from the stored state. SMM has traditionally been used to perform power management operations (e.g., responding to the press of the power button), access hardware directly and other relatively simple SMI tasks. These simpler SMI tasks can be completed very quickly and even instantaneously from the user perspective.

Recently, more complex SMI tasks are being performed. For example, signature verification, data analysis and/or transfer and firmware management operations are more commonly being performed by the BIOS as opposed to by the operating system. Performing such SMI tasks oftentimes requires a relatively substantial amount of time. Yet, to minimize the impact on the user experience, industry specifications limit the maximum duration of an SMI event (i.e., the amount of time between suspending and resuming normal operation). Even if complex SMI tasks can be completed within the allowed maximum duration, it is still generally undesirable to perform frequent and lengthy SMI tasks. For example, if the user is playing media when a lengthy SMI task is performed, there may be a noticeable glitch in the audio or video playback due to the suspension of playback during the SMI event.

BRIEF SUMMARY

The present invention extends to methods, systems, and computer program products for enabling an SMI task to be completed across multiple SMI events. An operating system (OS) agent can be employed to monitor the load on a computing device. Based on the load and in response to determining that an SMI task should be performed, the OS agent can create an SMI message that specifies a maximum duration for an SMI event and that segments the SMI data for the SMI task. The OS agent can provide the SMI message to BIOS as part of requesting that the SMI task be performed. During the resulting SMI event, the BIOS can reassemble the segmented SMI data and then perform the SMI task. If this processing cannot be completed within the specified maximum duration for an SMI event, the BIOS can pause its processing and cause a subsequent SMI event to occur during which the processing can be resumed. In this way, the SMI task can be completed across multiple SMI events while ensuring that no single SMI event exceeds the specified maximum duration.

When the performance of an SMI task creates SMI data, the BIOS can similarly segment the SMI data within an SMI response message. As with other types of processing it performs, if the BIOS cannot complete this segmentation of the SMI data within the specified maximum duration, it can pause its processing and cause a subsequent SMI event to occur during which it can resume its segmentation of the SMI data for inclusion in the SMI response message. Accordingly, the segmentation of SMI data, whether part of an SMI message sent to the BIOS or part of an SMI response message sent by the BIOS, facilitates the spanning of a single SMI task across multiple SMI events.

In some embodiments, the present invention may be implemented on a computing device that supports SMM as a method for completing an SMI task across multiple SMI events. In response to receiving an SMI message from an OS agent and during a first SMI event, BIOS can commence processing of an SMI task identified in the SMI message. During the first SMI event, the BIOS can schedule a subsequent SMI event and pause the processing of the SMI task. During the subsequent SMI event, the BIOS can resume the processing of the SMI task.

In some embodiments, the present invention may be implemented as computer storage media storing computer executable instructions which when executed on a computing device implement an OS agent and BIOS. The OS agent can be configured to monitor a load of the computing device. The OS agent can also be configured to send an SMI message to the BIOS to instruct the BIOS to perform an SMI task. The OS agent can include segmented SMI data in the SMI message where a segment size of the SMI data is based on the load. The BIOS can be configured to receive the SMI message from the OS agent and, in response, perform the SMI task across multiple SMI events.

In some embodiments, the present invention may be implemented as a computing device that includes a CPU, memory, an OS on which an OS agent runs and BIOS. The OS agent and the BIOS can be configured to cause an SMI task to be started during one SMI event and completed during a subsequent SMI event.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
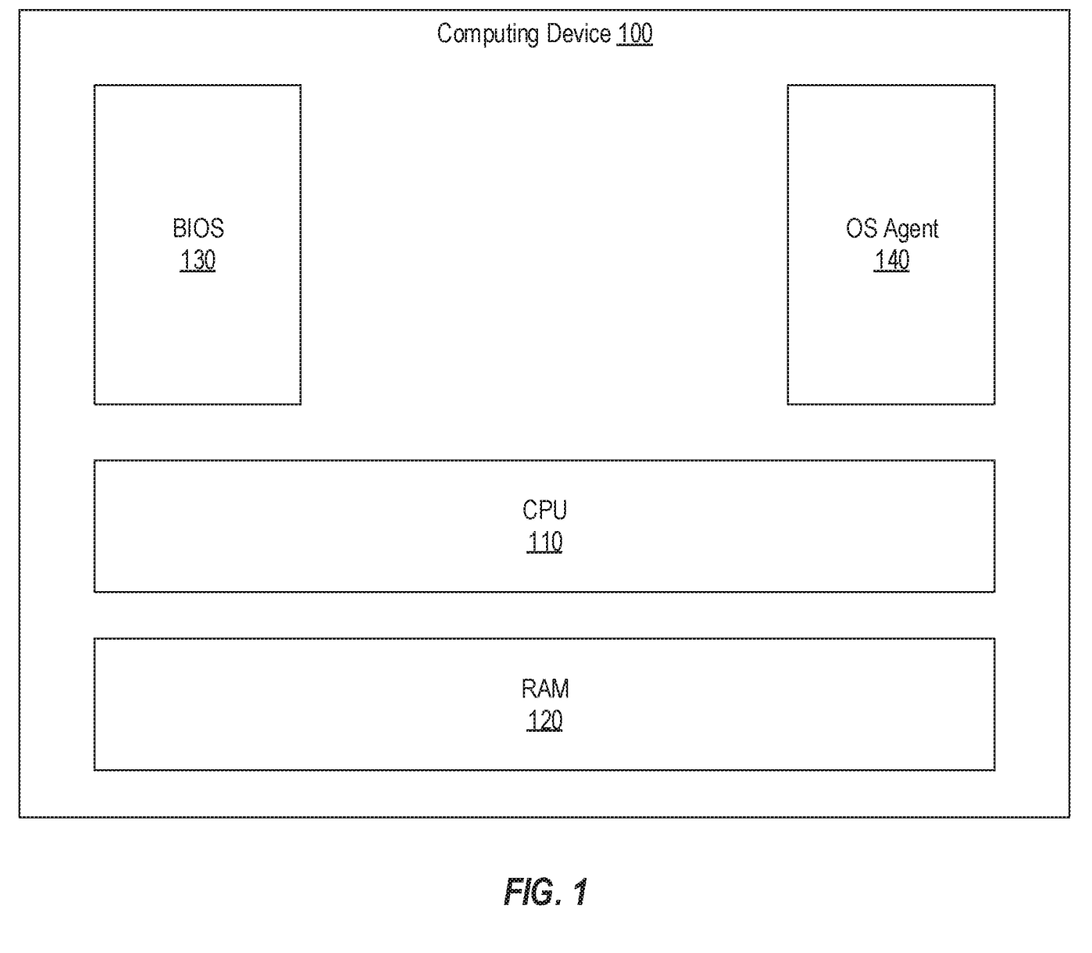
FIG. 1 illustrates an example computing environment in which embodiments of the present invention may be implemented.

FIG. 1 provides a generalized representation of a computing device 100 that is configured in accordance with embodiments of the present invention. Computing device 100 includes various hardware components such as CPU 110 and RAM 120, and various software/firmware components such as BIOS 130 and OS agent 140. CPU 110 can represent any central processing unit that is capable of implementing SMM, while RAM 120 can represent any number and/or type of computer storage media that may be employed to implement SMM.

BIOS 130 is intended to encompass legacy BIOS, UEFI BIOS and any other firmware that supports SMM. As described below, BIOS 130 can be customized in accordance with embodiments of the present invention to enable an SMI task to be completed across multiple SMI events. OS agent 140 is intended to represent any type of component that runs in the operating system context and, as a runtime counterpart to BIOS 130, performs the functionality described below to enable an SMI task to be completed across multiple SMI events.

In this specification and the claims, the term "System Management Mode" or SMM and "System Management Interrupt" or SMI should be given their industry standard and equivalent definitions. For example, SMM can be construed as an operating mode of CPU 110 in which the state of the operating system is suspended and stored in RAM 120 while BIOS 130 performs an "SMI task," and SMI can be construed as an interrupt that causes this operating mode to be entered. The term "SMI event" will be used to reference a single transition into SMM in response to an SMI. Accordingly, an SMI event is commenced upon entering SMM in response to an SMI and ends when SMM is subsequently exited.

The term SMI task should be construed as a task that BIOS 130 is instructed to perform while in SMM. Examples of SMI tasks include obtaining a status of a fan, battery or other hardware component, installing a firmware update, authenticating a BIOS admin password, collecting system health data, etc. The term "SMI data" should be construed as data that is provided to BIOS 130 as part of requesting that BIOS 130 perform a particular SMI task or data that BIOS 130 returns in response to a request to perform a particular SMI task. For example, if the SMI task is installing a firmware update, the SMI data may include the firmware image that OS agent 140 provides to BIOS 130. On the other hand, if the SMI task is collecting system health data, the SMI data may include the system health data that BIOS 130 collects and returns to OS agent 140. The term "SMI message" should be construed as a communication sent between OS agent 140 and BIOS 130 that includes the SMI data.

As an overview, embodiments of the present invention provide a communication protocol that enables BIOS 130 to complete an SMI task across multiple SMI events. As such, the present invention enables SMM to be leveraged for performing more complex SMI tasks without the risk of degrading performance. This communication protocol provides a way for OS agent 140 to segment the SMI data and to specify a maximum duration for an SMI event based on a load of computing device 110. Based on the segmentation of the SMI data, BIOS 130 can divide its processing of the SMI data and/or its performance of the corresponding SMI task across multiple SMI events if such processing and/or performance would exceed the specified maximum duration for an SMI event. Stated another way, OS agent 140 can control the duration of an SMI event to prevent performance degradation while also facilitating the performance of an SMI task across multiple SMI events. In this way, complex SMI tasks can be performed without the time limitations that would otherwise exist and without the risk of degrading the user experience.

Figure 2A:
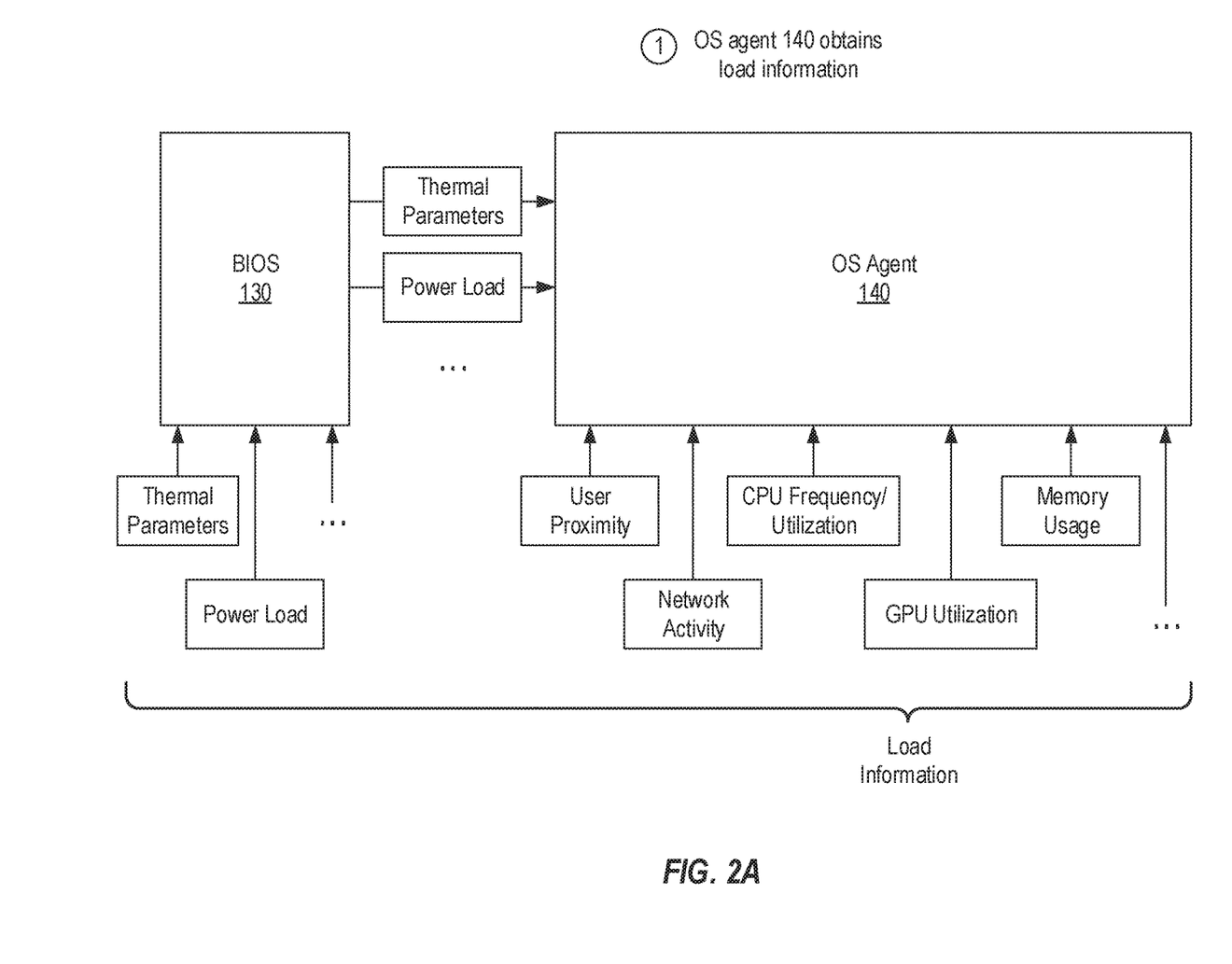
FIGS. 2A-2H provide an example of how an OS agent and BIOS can enable an SMI task to be completed across multiple SMI events.

FIGS. 2A-2H represent an example of how BIOS 130 and OS agent 140 may function in accordance with embodiments of the present invention to enable an SMI task to be completed across multiple SMI events. FIG. 2A illustrates a step 1 in which OS agent 140 obtains load information for computing device 100. This load information can include any amount and variety of information representing a load of computing device 100 such as thermal parameters and power load that may be collected by BIOS 130 and relayed to OS agent 140 (e.g., via WMI methods) and user proximity, network activity, CPU frequency/utilization, GPU utilization and memory usage that OS agent 140 may obtain directly. As represented by the ellipsis, the depicted types of load information are merely examples and OS agent 140 could collect any other types of load information in implementations of the present invention. Accordingly, embodiments of the present invention should not be limited by the type or amount of load information that OS agent 140 may collect or employ.

In some embodiments, OS agent 140 could be configured to collect load information at periodic intervals. For example, OS agent 140 could generate appropriate queries at defined intervals to collect the various types of load information from BIOS 130, resource monitors, or any other component that provides load information. OS agent 140 could also or alternatively be configured to collect load information on demand or in response to some occurrence or request. For example, another component on computing device 100 may be configured to notify OS agent 140 that an SMI task is to be performed, and in response, OS agent 140 may collect load information.

Figure 2B:
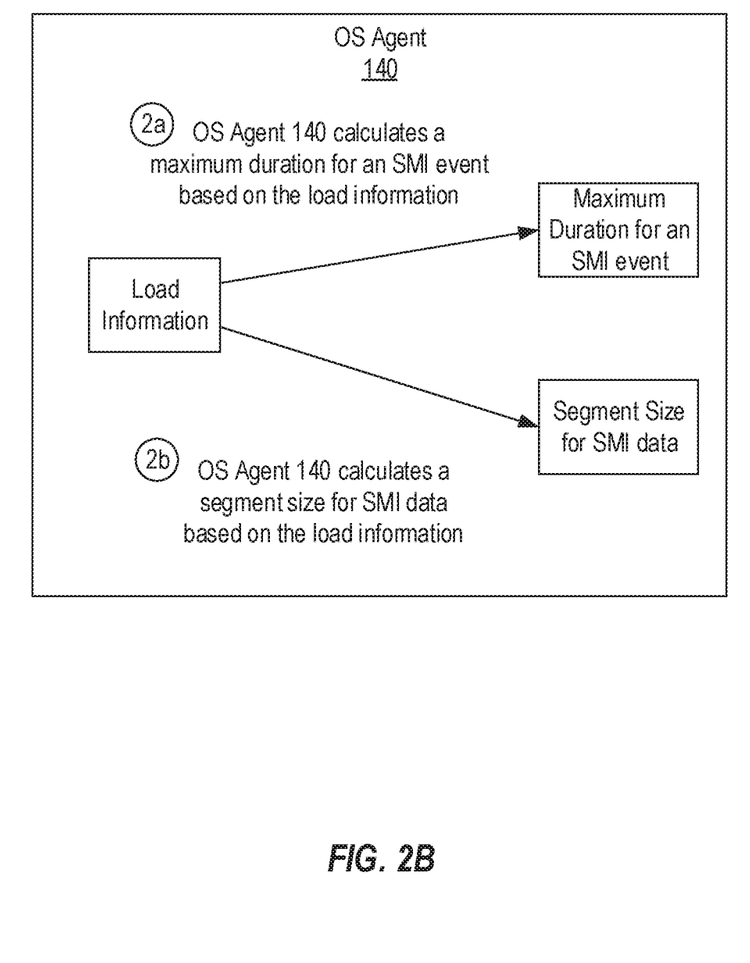

As represented as step 2a in FIG. 2B, OS agent 140 may employ the load information to dynamically determine a maximum duration for an SMI event. Stated another way, OS agent 140 can determine, based on the current load information, how long computing system can be in SMM without causing an undue degradation in performance. For example, if the load information indicates that the user is streaming media, OS agent 140 may determine that a shorter maximum duration for an SMI event should be defined given that the user may notice a glitch in media playback if the duration of an SMI event matches the industry standard maximum duration. Likewise, if the load information indicates that the CPU utilization is high, OS agent 140 may determine that a longer SMI event would cause a significant performance degradation. In contrast, if the load information indicates that the user is not present or that there is a minimal load, OS agent 140 may determine that a longer SMI event would go unnoticed or would otherwise have negligible impact on performance.

As represented by step 2b in FIG. 2B, in addition to using the load information to dynamically determine a maximum duration for an SMI event, OS agent 140 may also employ the load information to calculate a segment size to be used when segmenting the SMI data of a particular SMI task. In other words, OS agent 140 can dynamically calculate a segment size that is optimal for the load that exists at the time an SMI task is to be performed. In some embodiments, the segment size can be inversely proportional to the load such that a smaller segment size will be used when the load is higher.

OS agent 140 may be configured to perform step 2a and/or step 2b at periodic intervals, on demand such as when an SMI task is to be performed or in response to any other occurrence or criteria. In any case, when OS agent 140 determines that an SMI task should be performed, it can employ the maximum duration for an SMI event and the segment size that corresponds to the load that computing device 100 is experiencing at the time the SMI task will be performed. It is noted, however, that in some embodiments, OS agent 140 may not dynamically calculate a maximum duration for an SMI event based on current load. For example, in some embodiments, OS agent 140 may employ a predefined maximum duration for an SMI event such as an administrator- or end-user-defined maximum duration.

Figure 2C:
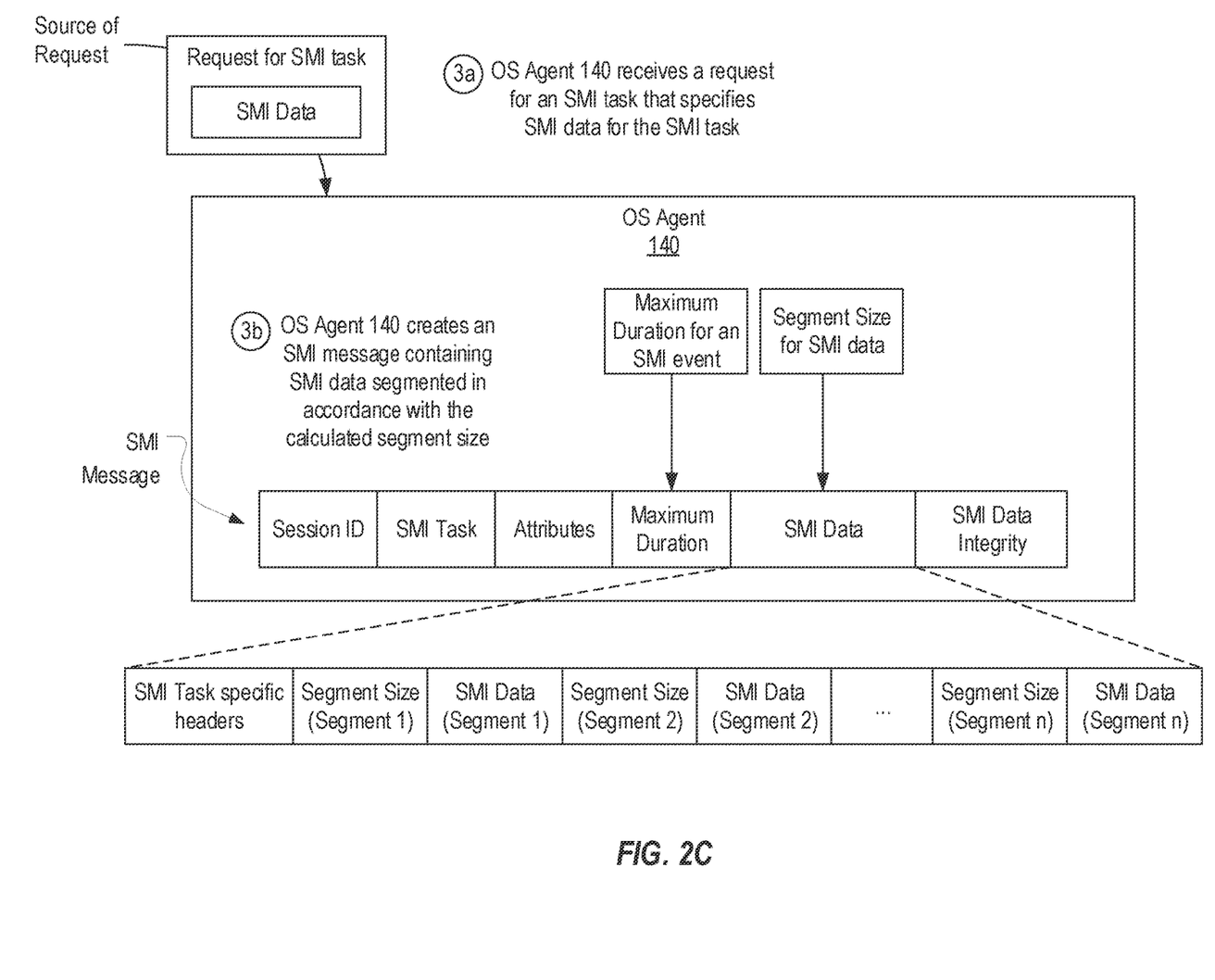

Turning to FIG. 2C, it is assumed, in step 3a, that OS agent 140 receives a request for performing an SMI task or otherwise detects that an SMI task should be performed. It is also assumed that the SMI task to be performed requires conveying SMI data to BIOS 130. For example, OS agent 140 could receive a request to update firmware which includes or identifies the update to be installed. In FIG. 2C, it is also assumed that OS agent 140 has already calculated or identified a maximum duration for an SMI event and the segment size for SMI data based on the current load that computing device 100 is experiencing (i.e., that OS agent 140 performed steps 2a and 2b before step 3a). However, OS agent 140 could equally perform steps 2a and 2b after receiving the request in step 3a.

In step 3b, OS agent 140 can create an SMI message for the SMI task to be performed, including segmenting the SMI data within the SMI message in accordance with the segment size that OS agent 140 calculated based on the current load. In the example shown in FIG. 2C, the SMI message includes a session ID field that provides a session ID to represent the SMI task that may be performed across multiple SMI events, an SMI task field which identifies the SMI task to be performed (e.g., update firmware), an attributes field that can specify any number or type of attributes (e.g., whether the SMI message includes SMI data, a priority of the SMI message, whether the integrity of the SMI data must be verified before performing the SMI task, etc.), a maximum duration field which can specify the maximum duration for an SMI event, the SMI data which may include SMI-task-specific headers in addition to the segmented SMI data and an SMI data integrity field that may include information to be used to verify the integrity of the SMI data and/or the entirety of the SMI message. As one specific example, if the SMI task is a firmware update, the SMI-task-specific headers could identify the device whose firmware is to be updated, an address where that device is accessible, a size of the firmware image and a hash of the firmware image. The firmware image could then follow in a number of segments (segments 1 through n) with sizes that match the segment size that OS agent 140 calculated from the current load. In such a case, the SMI data integrity field of the SMI message could include a signature of the unsegmented SMI data or other information that could be used to verify the firmware image once it is conveyed into the SMM context.

It is noted that not all SMI messages that OS agent 140 may create need have segmented SMI data or even any SMI data. For example, if the SMI task is the retrieval of the status of a fan, the SMI message may not include any SMI data. Accordingly, the SMI data and SMI data integrity portions of an SMI message may be optional in some embodiments of the present invention. Similarly, an SMI message may include SMI data that is not segmented. For example, if the SMI data for a particular SMI task is smaller than the segment size calculated for the current load, OS agent 140 may forgo segmenting it. In short, and as described in greater detail below, a primary reason for segmenting the SMI data is to facilitate BIOS 130's processing of the SMI data during multiple different SMI events. Therefore, this segmenting both enables longer, more complex SMI tasks to be performed and ensures that SMI events will not degrade performance.

Figure 2D:
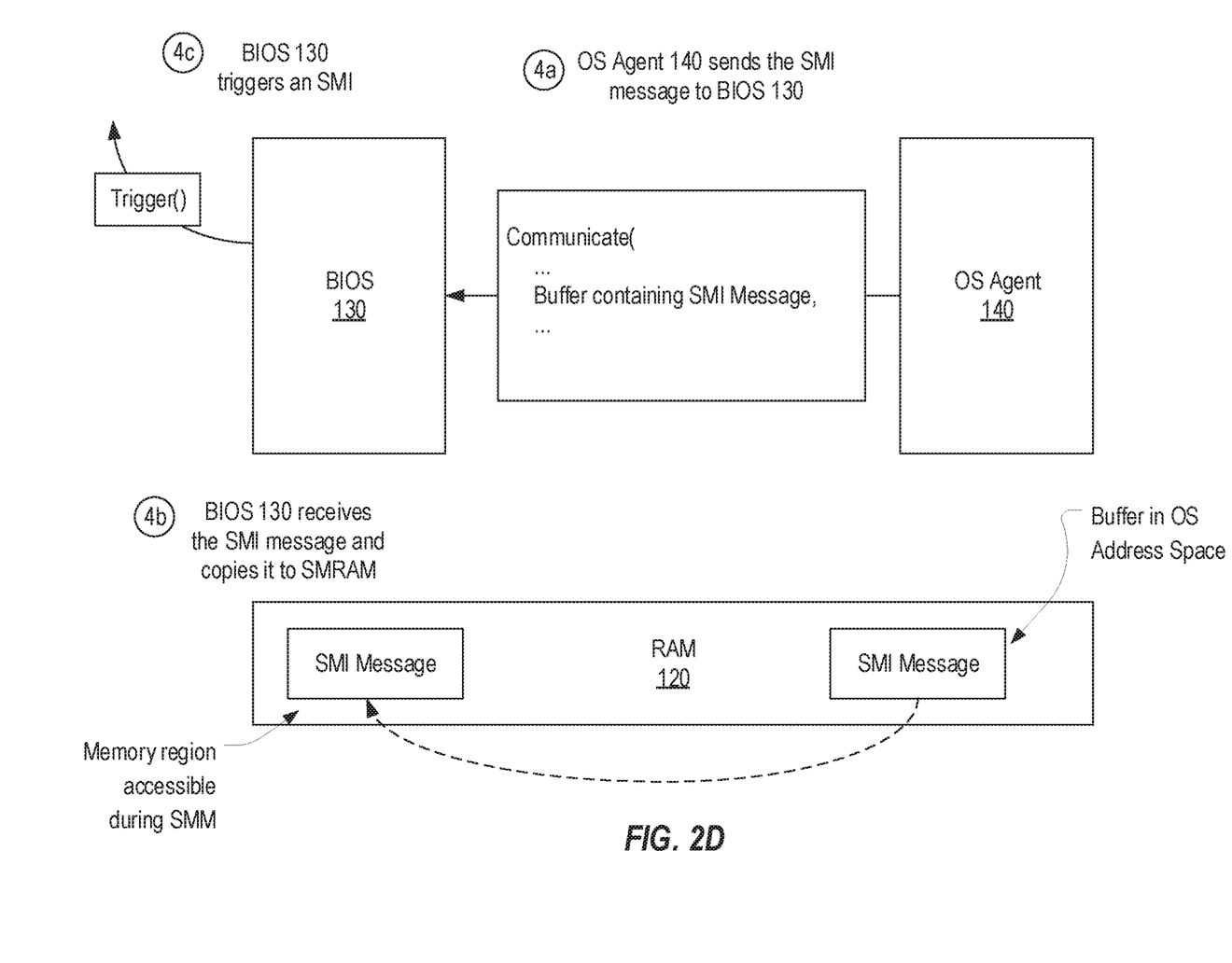

Turning to FIG. 2D, once it has created the SMI message for the SMI task, in step 4a, OS agent 140 can send the SMI message to BIOS 130 as part of requesting the performance of the SMI task. As one example only, in UEFI-based implementations, OS agent 140 could be configured to employ the EFI_SMM_BASE_PROTOCOL. Communicate( ) function to pass a pointer to a buffer in RAM 120 that contains the SMI message. In step 4b, BIOS 130 receives the SMI message and can copy it to SMRAM (or to some other location accessible during SMM). After obtaining the SMI message from OS agent 140, in step 4c, BIOS 130 can trigger an SMI to cause SMM to be entered. For example, BIOS 130 could invoke the EFI_SMM_CONTROL_PROTOCOL. Trigger( ) function. In some embodiments, BIOS 130 could perform steps 4b and 4c as a single step such as by providing the buffer containing the SMI message as input to the call to the Trigger( ) function. In any case, as a result of steps 4b and 4c, computing device 100 will enter SMM and the SMI message will be accessible to BIOS 130 during SMM.

Figure 2E:
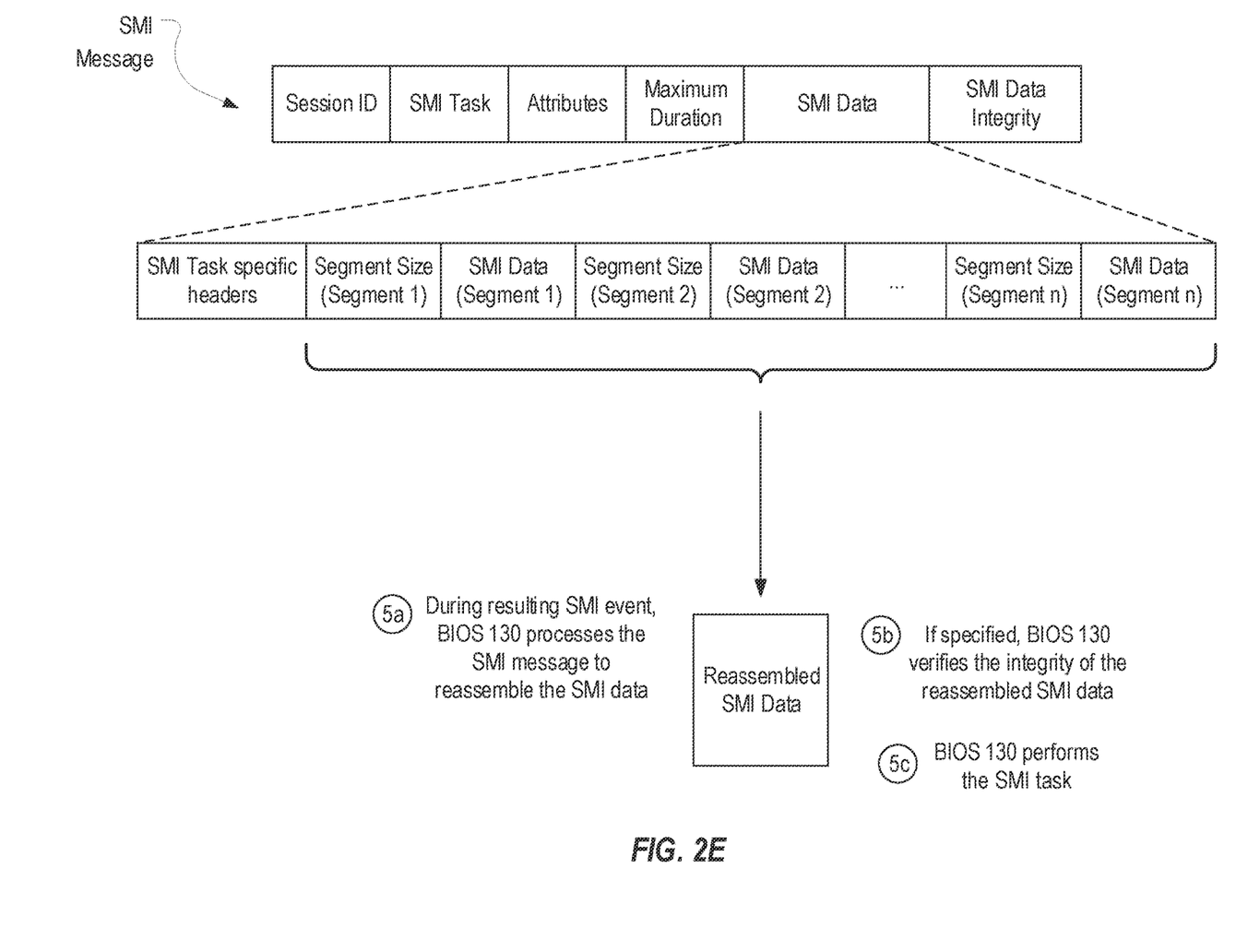

Turning to FIG. 2E, it is now assumed that SMM has been entered. As part of SMM, BIOS 130 can commence processing the SMI message that has been conveyed into the SMM context. As represented in step 5a, this processing can include reassembling the segments of SMI data. For example, BIOS 130 can extract each segment from the SMI message and store them as a contiguous block. Also, in step 5b, BIOS 130 can verify the integrity of the reassembled SMI data. For example, if the SMI message included an attribute that defines that integrity verification is required, BIOS 130 can employ whatever integrity information is provided in the SMI message to verify that the reassembled SMI data has not be tampered with, corrupted or otherwise altered. Then, in step 5c, BIOS 130 can perform the SMI task using the SMI data that is reassembled and possibly verified. For example, if the SMI data is a firmware image, BIOS 130 can write the reassembled and verified SMI data to the appropriate location.

As part of steps 5a-5c, BIOS 130 can monitor the duration of the current SMI event and compare it to the maximum duration for an SMI event that is specified in the SMI message. For example, in some instances, the process of parsing the SMI message, reassembling the various segments and/or verifying the integrity of the reassembled segments may take a relatively long amount of time such as when the SMI data is a large firmware image or when intensive verification techniques are implemented. Similarly, even if the SMI data can be reassembled and verified relatively quickly, it may take a relatively long amount of time to perform the SMI task. In short, the time required to complete the SMI task may exceed the specified maximum duration for an SMI event. In such cases, when BIOS 130 determines that it will not complete the SMI task within the specified maximum duration, it can temporarily pause its processing, store the state of the processing, schedule the auto-triggering of a subsequent SMI and then cause computing device 100 to transition out of SMM and back to normal operation. During the subsequent auto-triggered SMI event, BIOS 130 can resume its processing until it either completes the SMI task or determines that it should again pause its processing, schedule another SMI and transition back to normal operation. In this way, the processing of the SMI task can span multiple SMI events while ensuring that no single SMI event's duration exceeds the specified maximum duration.

Figure 2F:
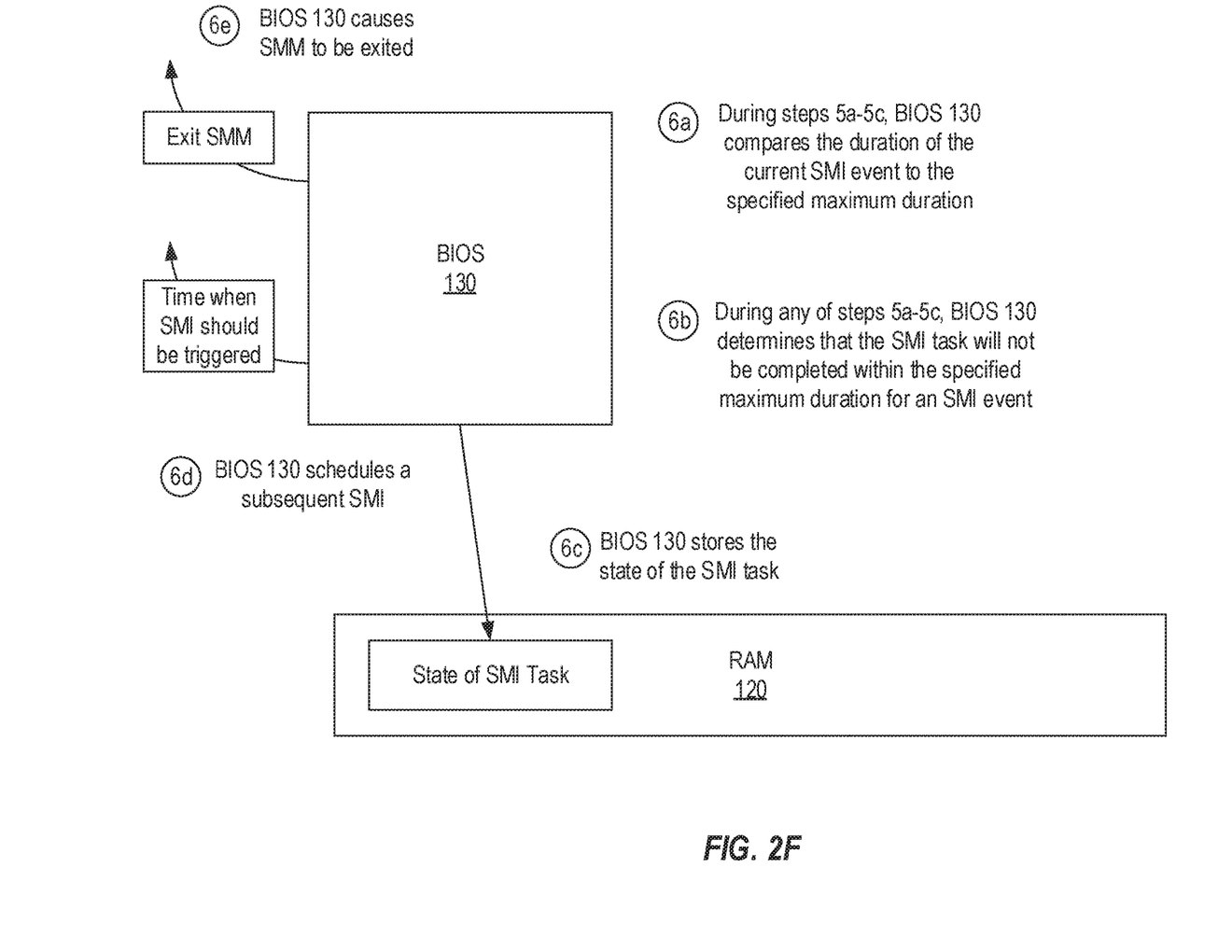

FIG. 2F provides an example of how BIOS 130 may accomplish this. In step 6a, which BIOS 130 may perform during any or all of steps 5a-5c, BIOS 130 can monitor the duration of the current SMI event and compare the duration to the specified maximum duration for an SMI event. In other words, BIOS 130 can determine whether the elapsed time during the current SMI event is approaching or has reached the maximum duration that OS agent 140 specified in the SMI message. In step 6b, which BIOS 130 may perform during any of steps 5a-5c, BIOS 130 can determine that the SMI task will not be completed within the specified maximum duration for an SMI event. For example, BIOS 130 may be in the process of reassembling segments and may determine that it will take longer than the specified maximum duration to complete the reassembly. In response, in step 6c, BIOS 130 can pause its processing of the SMI task and can store the state of the SMI task in a manner that will cause the state of the SMI task to remain accessible and to be resumable during a subsequent SMI event. For example, BIOS 130 could store the SMI message (or at least any unprocessed portion of the SMI message), any reassembled portion of the SMI data and an identification of the segment where processing left off. Similarly, if BIOS 130 has completed the reassembly of the SMI data but has not performed verification when it pauses its processing, or has completed verification but has not started or completed performing the SMI task, the stored state may so indicate.

In step 6d, BIOS 130 can also schedule the auto-triggering of an SMI at a subsequent time (e.g., by setting a timer), and in step 6e, can cause SMM to be exited to thereby return computing device 100 to normal operation. In some embodiments, BIOS 130 could perform step 6d during each SMI event that an SMI task spans or it could schedule a periodic auto-triggering of an SMI during the initial SMI event and then cancel the periodically scheduled SMI during the SMI event in which the SMI task is completed. Although not shown, BIOS 130 may provide an SMI response message back to OS agent 140 as part of step 6e even when the processing of the SMI task is not completed as described further below.

Figure 2G:
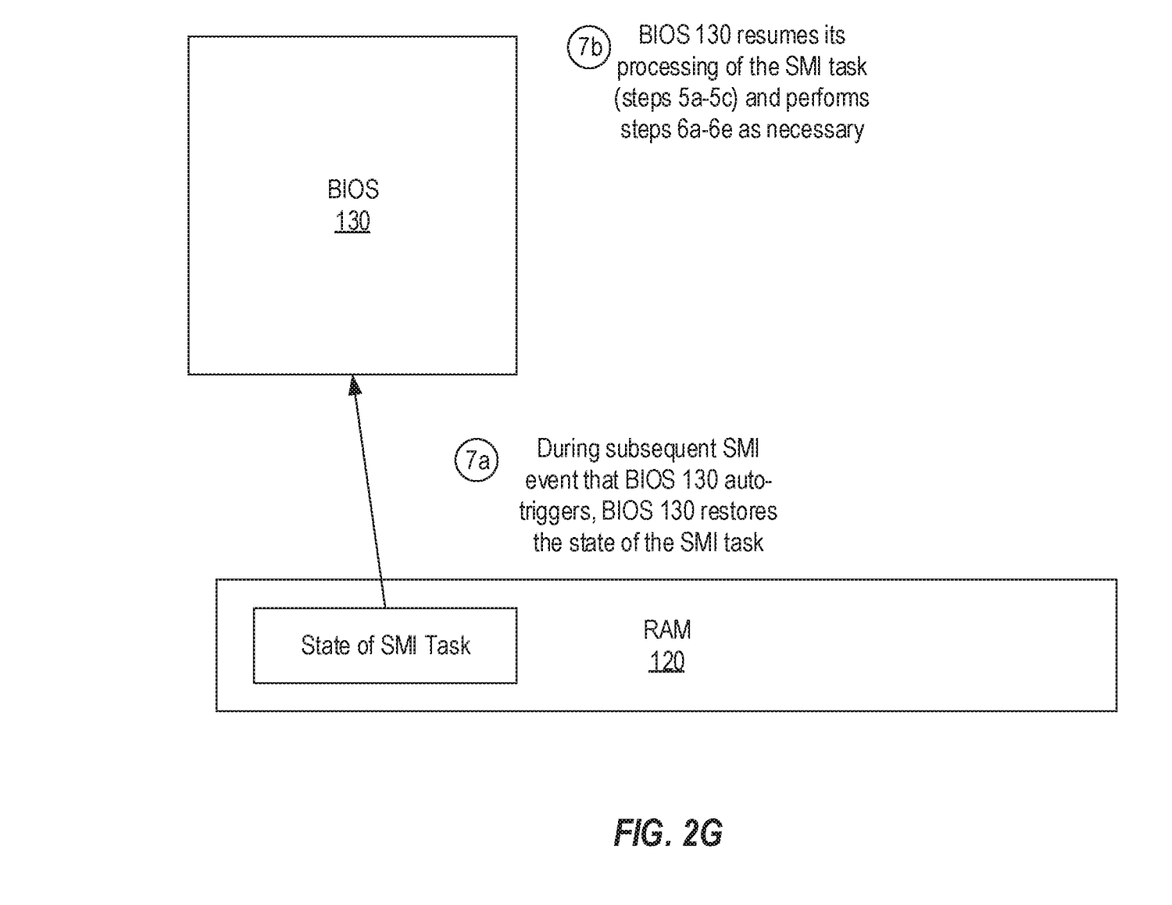

Turning to FIG. 2G, it is assumed that the SMI has been auto-triggered and that BIOS 130 is now executing during a subsequent SMI event. During this subsequent SMI event, and as represented by step 7a, BIOS 130 can retrieve the stored state of the SMI task and resume its processing. The figures represent a simplified example in which it is assumed that only a single SMI task is processed at any given time. However, it is noted that in some cases, BIOS 130 may have stored the state of multiple SMI tasks that are being concurrently processed. Therefore, in some embodiments, BIOS 130 may maintain a database (e.g., in SMRAM) where it maintains the state of any SMI task that has been paused. The session ID assigned to each SMI message can be used to distinguish between such SMI tasks. Accordingly, in such embodiments, step 7a can include accessing the database to identify any SMI task whose state has been stored. In step 7b, BIOS 130 uses the stored state to resume the processing of the SMI task. For example, BIOS 130 can resume step 5a, 5b or 5c—wherever it happened to pause the processing of the SMI task as defined in the stored state. During this resumed processing of the SMI task, BIOS 130 can perform steps 6a and 6b, and if necessary, perform steps 6c-6e to again pause the processing. In this way, BIOS 130 can cause the processing of the SMI task to span as many SMI events as are necessary to keep the duration of any single SMI event within the specified maximum duration.

Figure 2H:
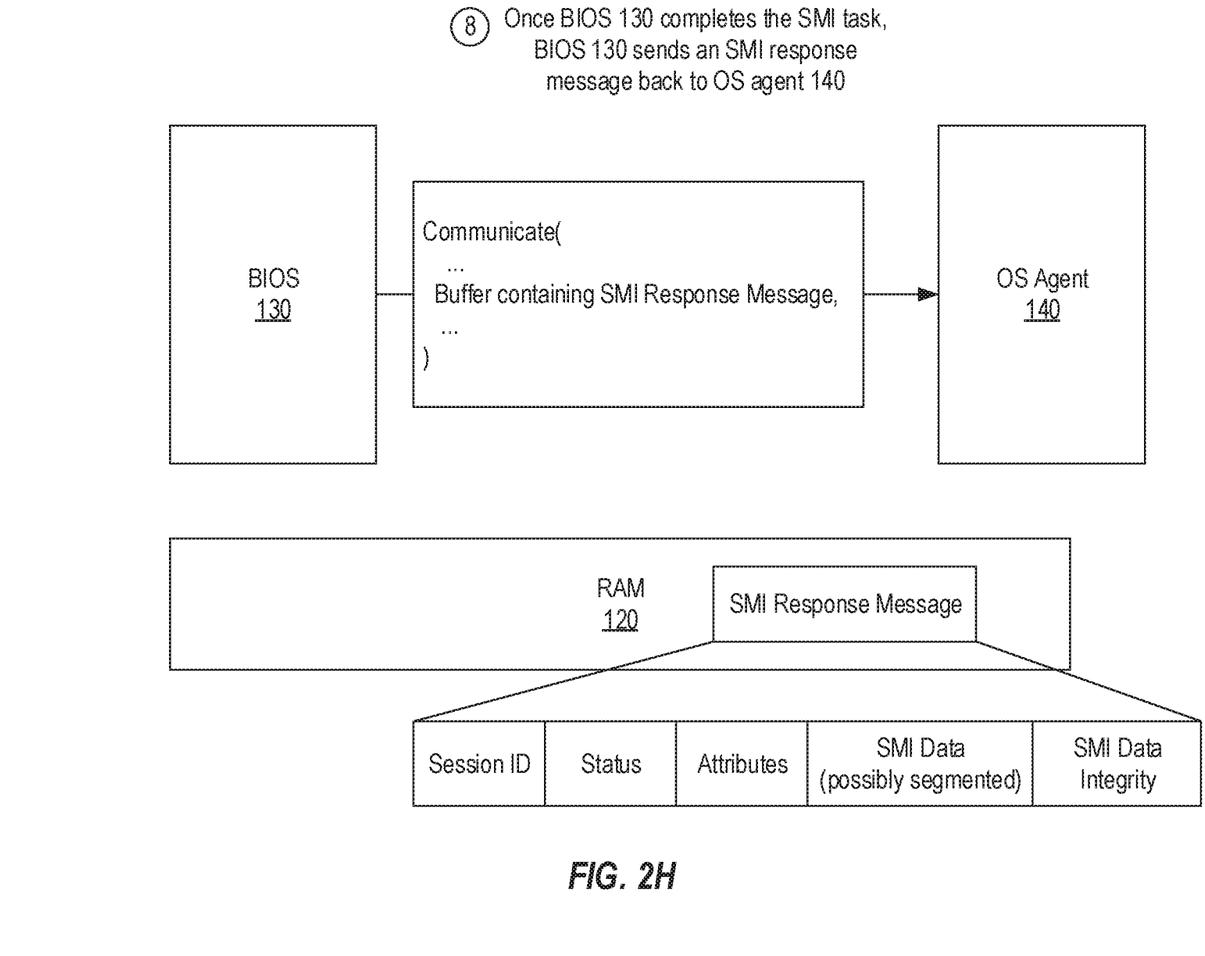

Finally, turning to FIG. 2H, in step 8, BIOS 130 completes its processing of the SMI task—which could have spanned multiple SMI events—and provides an SMI response message back to OS agent 140 (e.g., by storing the SMI response message in a buffer that is passed to OS agent 140 via the communicate function). As shown, an SMI response message may generally resemble an SMI message including having a session ID field that provides the session ID of the corresponding SMI message, a status field that provides a status of the SMI task specified in the corresponding SMI message (e.g., pending or completed), an attributes field, SMI data (depending on the SMI task) which may be segmented as described below and possibly an SMI data integrity field if OS agent 140 will be expected to verify the integrity of any SMI data in the SMI response message.

With some SMI tasks, BIOS 130 may be required to generate SMI data. For example, if the SMI task is the collection of system health data, BIOS 130 may have complied a significant amount of SMI data that needs to be returned to OS agent 140. As with processing SMI data that OS agent 140 provides in an SMI message, it may require more than the maximum duration for an SMI event for BIOS 130 to compile and return such SMI data. Accordingly, as part of step 5c, BIOS 130 can segment the SMI data in a similar manner as OS agent 140 segments SMI data. During this segmenting, BIOS 130 may also perform steps 6a-6e leading to the segmenting being paused and then resumed during a subsequent SMI event. By segmenting the SMI data that will be returned in the SMI response message, BIOS 130 facilitates this pausing and resuming of SMI tasks that produce SMI data.

Whether or not BIOS 130 segments the SMI data it includes in an SMI response message, OS agent 140 can process the SMI data in any appropriate manner. For example, if the SMI data is system health data or telemetry data, OS agent 140 can relay the SMI data (after reassembling and verifying it if necessary) to an appropriate component on computing device 100, on a management server or on any other device.

In summary, the above-described techniques can facilitate performing a number of tasks in the SMM context that otherwise could not be performed—at least without significantly degrading performance and/or disregarding industry specifications. For example, these techniques can enable complex tasks within the SMM context such as gathering hardware and firmware telemetry data for use in predictive analysis, authentication and/or encryption for BIOS configuration changes, firmware updates while the OS is running, etc.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed on a computing device that supports system management mode (SMM), for completing a system management interrupt (SMI) task across multiple SMI events, the method comprising:
    in response to receiving an SMI message from an operating system (OS) agent, commencing, by BIOS during a first SMI event that is commenced upon entering SMM a first time, processing of an SMI task identified in the SMI message;
    during the first SMI event, scheduling a subsequent SMI event;
    pausing the processing of the SMI task;
    causing SMM to be exited while the processing of the SMI task is paused; and
    during the subsequent SMI event that is commenced upon entering SMM a second time, resuming the processing of the SMI task.

2. The method of claim 1, wherein the SMI message includes SMI data, and wherein the processing of the SMI task includes processing the SMI data.

3. The method of claim 2, wherein the SMI data is segmented in the SMI message, and wherein processing the SMI data includes reassembling the SMI data.

4. The method of claim 3, wherein the OS agent segments the SMI data using a segment size that is based on a current load of the computing device.

5. The method of claim 2, wherein processing the SMI data includes verifying the SMI data.

6. The method of claim 5, wherein the SMI data is segmented in the SMI message, wherein processing the SMI data includes reassembling the SMI data, and wherein verifying the SMI data includes verifying the reassembled SMI data.

7. The method of claim 1, wherein the SMI message defines a maximum duration for an SMI event, the method further comprising:
    determining that an elapsed time of the first SMI event is approaching or has reached the maximum duration;
    wherein pausing the processing of the SMI task is performed in response to the determination.

8. The method of claim 7, wherein the maximum duration is based on a current load of the computing device.

9. The method of claim 1, wherein the processing of the SMI task includes creating SMI data.

10. The method of claim 9, wherein creating SMI data includes segmenting the SMI data.

11. The method of claim 10, wherein pausing the processing of the SMI task comprise pausing the segmenting of the SMI data.

12. The method of claim 10, further comprising:
    sending, to the OS agent, an SMI response message that includes the segmented SMI data.

13. The method of claim 1, wherein the processing of the SMI task comprises one or both of:
    performing the SMI task using SMI data contained in the SMI message; or
    performing the SMI task to generate SMI data.

14. One or more computer storage media storing computer executable instructions which when executed on a computing device implement the following components:
    an OS agent that is configured to monitor a load of the computing device and that is configured to send an SMI message to BIOS to instruct the BIOS to perform an SMI task, wherein the OS agent includes segmented SMI data in the SMI message where a segment size of the SMI data is based on the load; and
    the BIOS that is configured to receive the SMI message from the OS agent and, in response, perform the SMI task across multiple SMI events, wherein each of the multiple SMI events is commenced upon entering SMM in response to an SMI and ends when SMM is subsequently exited.

15. The one or more computer storage media of claim 14, wherein the OS agent includes a maximum duration for an SMI event in the SMI message where the maximum duration is based on the load, and wherein the BIOS performs the SMI task across multiple SMI events by, at least one time, determining that processing of the SMI task in a current SMI event cannot be completed within the maximum duration and causing a subsequent SMI event to occur during which the BIOS resumes the processing of the SMI task.

16. The one or more computer storage media of claim 14, wherein the OS agent is configured to send a second SMI message to the BIOS to instruct the BIOS to perform a second SMI task, the second SMI message including a second maximum duration for an SMI event that is based on the load of the computing device when the second SMI task is to be performed;
    wherein the BIOS performs the second SMI task across multiple SMI events, the performance of the second SMI task including creating SMI data.

17. The one or more computer storage media of claim 16, wherein creating SMI data includes creating an SMI response message corresponding to the second SMI message and segmenting the SMI data in the SMI response message.

18. A computing device comprising:
a central processing unit;
memory;
an OS on which an OS agent runs; and
BIOS;
wherein the OS agent and the BIOS are configured to cause an SMI task to be started during a first SMI event and completed during a subsequent SMI event, wherein the first SMI event and the subsequent SMI event are each commenced upon entering SMM in response to an SMI and end when SMM is subsequently exited, wherein causing an SMI task to be started during the first SMI event and completed during the subsequent SMI event comprises:
specifying, by the OS agent, a maximum duration for an SMI event that is based on a load of the computing device; and
pausing, by the BIOS, processing of the SMI task during the first SMI event when the processing of the SMI task cannot be completed within the specified maximum duration, causing the subsequent SMI event to occur and then resuming the processing of the SMI task during the subsequent SMI event.

19. The computing device of claim 18, wherein one or both of the OS agent and the BIOS are configured to segment SMI data in SMI messages that are exchanged between the OS agent and the BIOS where a segment size is based on a load of the computing device.

20. The computing device of claim 18, wherein one or both of the OS agent and the BIOS are configured to segment SMI data in SMI messages that are exchanged between the OS agent and the BIOS, wherein the SMI messages include SMI data, and wherein the processing of the SMI task includes processing the SMI data, wherein the SMI data is segmented in the SMI message, and wherein processing the SMI data includes reassembling the SMI data.

* * * * *